United States Patent Office 3,213,515
Patented Oct. 26, 1965

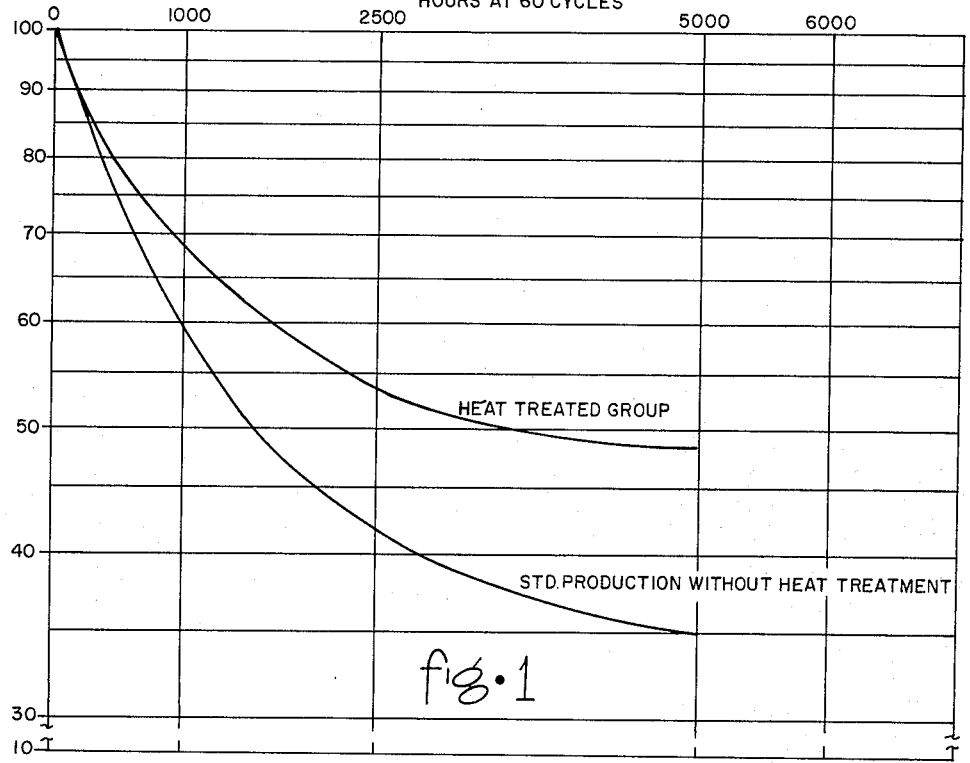
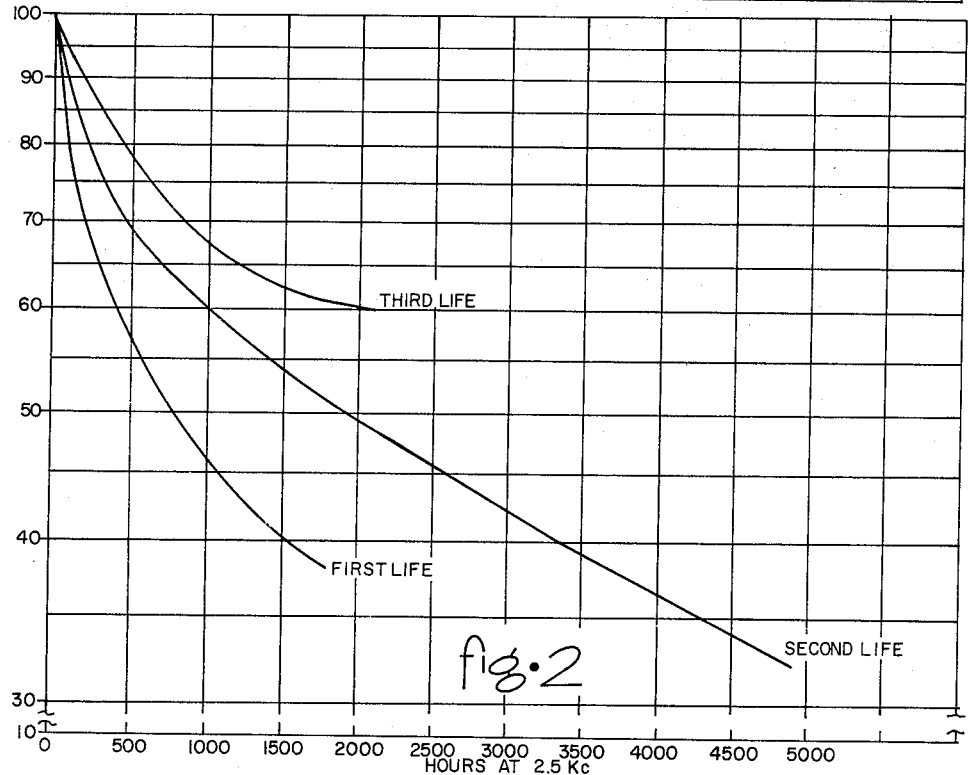

3,213,515
PROCESS FOR INCREASING LIGHT EMISSION, STABILIZATION AND REJUVENATION OF ELECTRO-LUMINESCENT LAMPS AND PHOSPHORS
Frederic Koury, Lexington, and Paul Fortucci, Lynn, Mass., assignors to Sylvania Electric Products Inc., a corporation of Delaware
Filed Feb. 6, 1961, Ser. No. 87,369
3 Claims. (Cl. 29—25.1)

This invention relates to electroluminescent lamps and phosphors and is particularly concerned with a process for increasing the life of electroluminescent phosphors and stabilizing their emission. Furthermore, the invention concerns rejuvenating electroluminescent lamps and electroluminescent phosphors which had their light emission reduced because of extended operation.

Since the practical application of electroluminescence, the art has sought methods of extending the life of electroluminescent lamps and increasing their brightness and in this search, various phosphor compositions have been used, meeting with varying degrees of success. In many cases, however, changes in the composition require modifications in processing conditions, such as firing times and temperatures. Requirements for such variations and modifications may be detrimental to the efficient operation of a production line, since delays often occur during adjustments. Therefore, to remedy these difficulties, a processing step independent of such variations and applicable to all electroluminescent phosphors has been sought.

It has been discovered that when electroluminescent devices which have yet to be placed in service are subjected to a heat treating step under controlled conditions, their light emission is substantially increased. This discovery is quite important, since through the addition of a single processing step to a production line, a material improvement in lamp operation is realized.

In addition to applicability in the treatment of unused electroluminescent devices, the heating step may also be employed for improving electroluminescent lamps whose light emission has been reduced because of extended operation. When such lamps are treated, the phosphor is rejuvenated and greater light emission is obtained. Quite surprisingly, it has been discovered that light emission from a treated and rejuvenated phosphor will be stabilized, so that rather than gradually decreasing during extended operation, the amount of emitted light will remain substantially constant.

Our process for rejuvenating and increasing light emission of the phosphor involves a heat treatment in which an electroluminescent phosphor embedded in a light-transmitting ceramic dielectric or an electroluminescent lamp having a ceramic dielectric is rapidly heated to a temperature slightly below the melting point of the dielectric and such heat is maintained for a short period of time. These heating methods are equally applicable to both used and unused electroluminescent phosphors.

Accordingly, it is the primary object of this invention to increase the life and obtain greater brightness from electroluminescent phosphors and electroluminescent lamps.

An important feature of this invention resides in the rapid elevation of the temperature of an electroluminescent lamp and the maintenance of such temperatures for a short period of time, as a result of which a previously unused lamp has its brightness increased and exhibits a longer useful life. Used lamps may have their life extended and re-extended by the process according to this invention.

Other objects and features will become apparent to those skilled in the art upon reading the following specification in conjunction with the accompanying drawing in which:

FIGURE 1 of the drawing is a graph illustrating the reduction in light output of two groups of electroluminescent lamps. One group of the tested lamps has been heat treated according to this invention; the other has not. In each instance, the subject lamps were previously unused.

FIGURE 2 of the drawing is a graph illustrating the extension and re-extension of the useful life in an electroluminescent lamp by heat treatment according to this invention. Each curve on the graph depicts the increase in illumination obtained from a lamp which had reduced light emission due to extended operation.

Electroluminescent lamps are well known in the art and are described, for example, in U.S. Patent to Mager 2,566,349. Such lamps comprise two electrodes, at least one of which is light transmitting, and an interposed layer of light-producing material. In forming the light-producing layer, an electroluminescent phosphor, such as activated zinc sulfide described in the co-pending application of Goldberg et al., Serial No. 714,481, filed February 11, 1958, now Patent No. 3,050,655, is dispersed in a light-transmitting ceramic embedding material, for example as described in the application of Richard M. Rulon, Serial No. 365,617, filed July 2, 1953, now abandoned. One of the two electrodes may be a metal plate which serves as a backing and imparts rigidity and stability to the lamp; however, other suitable materials such as glass adapted to conduct electricity may also be used. The other of the two electrodes is generally a thin layer of electrically conductive, light-transmitting material. Although other procedures are possible, the best known method of preparing this conductive layer for the lamp is spraying the phosphor-dielectric layer, while hot, with a solution of a metal compound, for example the chlorides and less commonly the oxides, sulfates or organic complexes of preferably tin or possibly indium or antimony. It is generally good practice to coat and fuse a layer of light-transmitting glass over the light-transmitting electrode in order to prevent accidental removal and scratching of the electrically conductive layer. Additionally, the glass protects the phosphor from the effects of humidity, which at times may produce serious difficulties in the operation of the lamp such as electrical leakage and the gradual spreading of "inert areas."

In the stabilization and rejuvention process of this invention, an electroluminescent phosphor dispersed in a solid light-transmitting ceramic dielectric, or of course the fabricated electroluminescent lamp, is heated to a temperature just below the fusing point of the dielectric-phosphor layer. The heating must be rather rapid and of relatively short duration; however, sufficient time must be allowed to thoroughly heat the entire dielectric-phosphor layer. In lamps now produced, this temperature will generally be between 550° C. and 750° C. and the heating time generally between 15 secs. and 1 minute. In such lamps, a heating time or less than 15 secs. does not thoroughly heat the entire lamp and greater than one minute tends to unduly degrade the light emission of the phosphor. Whether treating used or unused lamps, such heating times and temperatures are equally important, although they may be changed if the conventional lamps are modified. For example, if layer thicknesses of the lamp are increased, longer heating times may be required to heat the phosphor-dielectric layer to just below its fusing point or, for example, if the protective layer of glass over the light-transmitting electrode is eliminated, shorter heating times may be allowable.

Reference is now made to FIGURE 1 of the drawing which shows two curves depicting a comparison between two groups of previously unused lamps. One group illustrated in the upper curve and captioned "heat treated group" has been subjected to the heat treatment step according to this invention. The other group illustrated in the lower curve and captioned "standard production without heat treatment" has been obtained directly from the production line and has not been subsequently heat treated. The ordinate of the graph is recorded in percent lumen maintenance and the abscissa is recorded in hours of lamps illumination at 60 cycles. Since no lumen maintenance reading was obtained below 30 percent, the portion of the graph below 30 percent is illustrated merely by broken lines.

After initially illuminating the lamps, the percent lumen maintenance tends to decrease and although the decrease is rather rapid at first in both groups, the advantage of our heat treatment step, which in this case was heating the lamp to 650° C. for 30 seconds, becomes apparent after about 250 hours of illumination at which point the curve illustrating the heat-treated group separates from the curve illustrating the untreated group. After the separation, the percent lumen maintenance of the heat-treated group is greater at each and every hour of illumination. For example, at 1000 hours the heat treated group had about an 8% greater percent lumen maintenance than the untreated group and at 3000 hours this increase had climbed to 13%; at 5000 hours the difference had risen to 18%. The stabilization of the light emission in the heat treated group is evidenced at 5000 hours when the curve tends to become substantially horizontal. On the other hand, the curve illustrating the untreated lamps continues to drop and shows no tendency to develop a horizontal slope. It is thus apparent from a comparison of these two curves that the brightness of the heat treated group will diminish at a substantially lesser rate than the brightness of the standard production lamps which were not subjected to the heat treatment according to this invention.

In FIGURE 2, a single used lamp has been the subject of the test and the curves illustrate the extension and re-extension of the useful life of the lamp by my heat treatment step. The ordinate in this graph is recorded in percent lumen maintenance and the abscissa is recorded in hours of lamp illumination at 2.5 kilocycles. Before the readings were taken to prepare the data for these curves, the subject lamp was operated for an extended period of time. It was then heated and the percent lumen maintenance recorded as an original reading of 100%, thus initiating the curve illustrating the "first life." After the percent lumen maintenance had dropped to about 38%, the lamp was reheated according to this invention and the lumen maintenance again recorded initially at 100%; subsequent readings taken form the curve marked "second life." The curve illustrating the "third life" was formed after a similar heat treatment and in the same manner as the curve marked "second life." In all readings, the subject lamp was the same.

In the series of tests illustrated in FIGURE 2, the heat rejuvenation was repeated three times; between each heating the lamp was illuminated and through operation, the light output was considerably reduced. In the lower curve marked "first life" the percent lumen maintenance had dropped to about 36% within about 2000 hours. After heating according to this invention, i.e., to about 650° for 30 seconds, the lamp was again illuminated; in this "life," however, the 36% lumen maintenance level was reached after about 3500 hours rather than in only 2000 hours, which was the case in the "first life." After about 4900 hours of illumination in the "second life," the lamp was again heated to about 650° for 30 seconds for the series of tests designated as the "third life." Percent lumen maintenance in this "third life" is materially increased over either the first or second lives of the lamp. The decrease to the 36% level reached in the first and second lives of the lamp was never reached in the "third life." Since this curve is relatively horizontal after a bit more than 2000 hours, it will be expected that a lamp will maintain a constant brightness for an extended period of time.

In the tests illustrated by the curves of FIGURES 1 and 2, the subject lamps or groups of lamps were at room temperature and the phosphor heated to elevated temperatures only for stabilization and rejuvenation. It is well known that an electroluminescent phosphor may be excited to maximum emission during operation by raising the ambient temperature, for example, if a lamp is maintained in a warm atmosphere during operation, greater light will be emitted.

It is apparent that changes and modifications may be made in the process without departing from the spirit and scope of the invention.

As our invention we claim:

1. In a process for the stabilization of emission and extension of life of an electroluminescent phosphor embedded in a fused glass dielectric, the step which comprises, heating said embedded phosphor to a temperature slightly below that of the fusion point of the glass dielectric for a short period of time.

2. In a process for the stabilization of emission and extension of life of an embedded electroluminescent phosphor, the step which comprises, reheating said embedded phosphor to a temperature between about 550° C. to 750° C. for a period of time between about 15 seconds and one minute.

3. In a process for stabilizing the emission and extending the life of an electroluminescent device having an electroluminescent phosphor in association therewith, the step which comprises, reheating said electroluminescent phosphor in the device to a temperature between about 550° C. to 750° C.

References Cited by the Examiner

UNITED STATES PATENTS

| 2,884,298 | 4/59 | Bryen | 316—2 |
|---|---|---|---|
| 2,910,337 | 10/59 | Patton | 316—2 |
| 3,082,344 | 3/63 | Thornton | 252—301.65 |

FOREIGN PATENTS 782,095  9/57  Great Britain.

RICHARD H. EANES, Jr., *Primary Examiner.*

LEON PEAR, *Examiner.*